United States Patent [19]
Trulaske et al.

[11] Patent Number: 5,633,674
[45] Date of Patent: May 27, 1997

[54] HAND-HELD READING DEVICE FOR THE VISUALLY IMPAIRED

[75] Inventors: James Trulaske; Daniel M. Meyer, both of St. Louis County, Mo.

[73] Assignee: Vision Technology, Inc., Maryland Heights, Mo.

[21] Appl. No.: 353,801

[22] Filed: Dec. 12, 1994

[51] Int. Cl.$^6$ .................. H04N 7/18; H04N 9/47
[52] U.S. Cl. .................................................. 348/63
[58] Field of Search .................. 348/63, 62, 158, 348/345, 335, 360, 347, 358, 373, 374, 375, 376

[56] References Cited

U.S. PATENT DOCUMENTS

| | | |
|---|---|---|
| 2,420,716 | 5/1947 | Morton et al. . |
| 3,816,646 | 6/1974 | Cinque . |
| 3,819,855 | 6/1974 | Rush et al. . |
| 3,993,865 | 11/1976 | Browne et al. . |
| 4,115,813 | 9/1978 | Mikami . |
| 4,136,361 | 1/1979 | Doan . |
| 4,838,791 | 6/1989 | Bogosian, Jr. et al. ............ 235/472 |
| 4,928,170 | 5/1990 | Soloveychik et al. . |
| 5,046,163 | 9/1991 | Priest et al. . |
| 5,194,956 | 3/1993 | Iwamoto ............................ 348/347 |

OTHER PUBLICATIONS

Brochure on Optelec —Independence Solutions for People with Low Vision 1993.
Innovations, Inc. Letter with article from Rocky Mountain News, dated Aug. 10, 1992, "Device Lets Even The Legally Blind Read".
Brochure Seewell Reading Enhancers, Model #73.
Brochure EZ Reader —Value in Low Vision Technology.
Brochure Telesensory Chroma CCD Jan. 1991.
Brochure Telesensory CCTV Systems May 1991.

*Primary Examiner*—Amelia Au
*Attorney, Agent, or Firm*—Paul M. Denk

[57] ABSTRACT

A magnifying device for magnifying an object and displaying the object on a monitor is disclosed. The magnifying device includes a hand held unit and a base unit. The hand held unit includes a solid state camera which is mounted in a housing. The housing is supported above the text to be enlarged by a set of legs having rollers extending therebetween, to allow the hand held unit to be easily and smoothly moved across the text. The hand unit includes a focusing control and a zoom control. The focusing and zoom controls are interconnected so that the image will not have to be refocused if the magnification of the image is changed. The camera converts the image to an electrical signal which is sent to the base unit. The base unit includes inverting circuitry to convert the image from black on white to white on black, if desired. The base unit can be connected either to video monitor or a standard television. When connected to the television, the devise will not impair normal use of the television when the unit is turned off. All controls for the device are located on the hand unit to be easily accessible at all times.

20 Claims, 8 Drawing Sheets

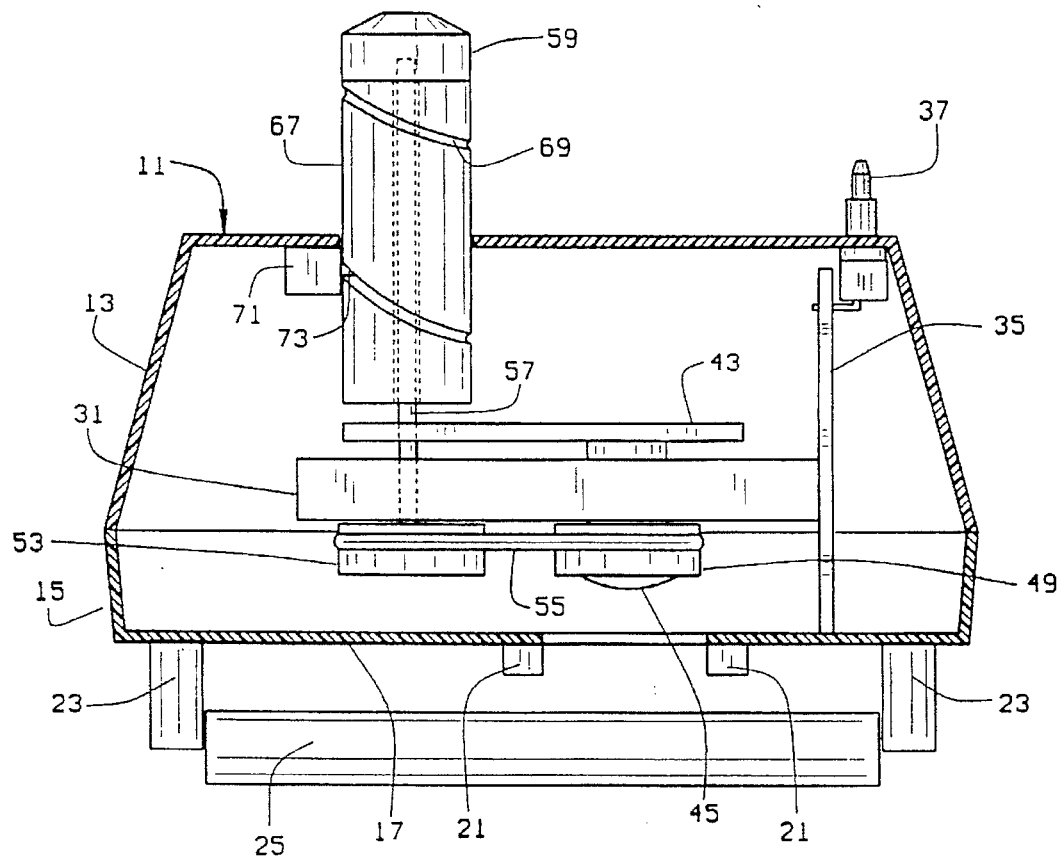
FIG. 6
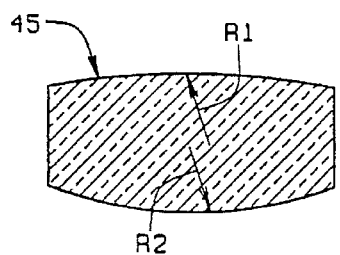
FIG. 7
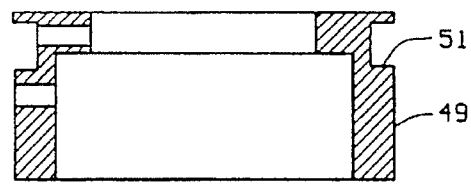
FIG. 8
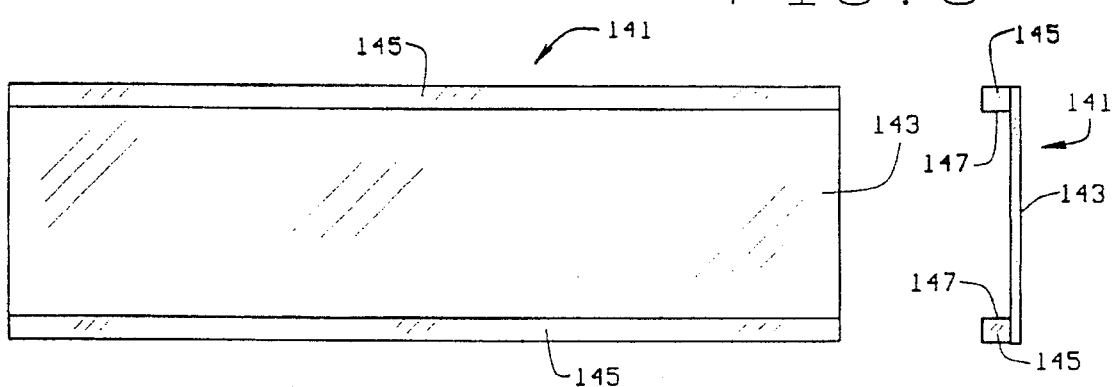
FIG. 9
FIG. 10

HAND-HELD READING DEVICE FOR THE VISUALLY IMPAIRED

BACKGROUND OF THE APPLICATION

This invention relates to reading devices to enable people with low vision to read books, magazines, newspapers, etc. More specifically, this invention relates to a hand held camera which may be passed over text to display the text in greatly magnified form on a screen, such as a television screen.

Low vision is defined as a condition where ordinary eye glasses or contact lenses cannot provide sharp sight. Presently, the number of people having low vision is estimated to be over 14 million people in the United States alone. Low vision can be caused by a variety of eye problems. Macular degeneration, glaucoma, diabetic retinopothy, detached retina, and retinitis pigmentosa are but a few of the conditions which can cause low vision. Individuals with low vision find it difficult, if not impossible, to read newspapers, books, recipes, prescriptions, or other reading material. Reading glasses and magnifying glasses provide insufficient enlargement for large numbers of people.

One generally well known method of providing greater magnification is the use of closed circuit television systems which include a video camera, a monitor for displaying the image, and a means for transferring the image from the camera to the monitor. These systems fall generally into two categories. The first category includes desk-top systems which have a video monitor with a camera mounted beneath it. A support arm holds the monitor, camera, and control box above a movable support platen for holding the material to be viewed. Examples of desk-top systems are shown in U.S. Pat. Nos. 3,819,855 to Rush et al., U.S. Pat. No. 3,816,646 to Cinque, U.S. Pat. No. 4,115,813 to Mikami, and U.S. Pat. No. 4,928,170 to Soloveychik et al. These systems are large, and thus not easily transportable.

The second category of devices includes a variety of hand held systems. These systems consist of a video monitor connected to a small camera housed in an enclosure which can be moved about the printed material by hand. Such hand held devices are shown in U.S. Pat. No. 3,993,865 to Browne et al, U.S. Pat. No. 4,136,361 to Doan, and U.S. Pat. No. 5,046,163 to Priest et al.

All of these prior devices have sever limitations. They are often difficult to use, lack portability, and restrict the user to a specific position in front of the unit in order to work the controls. Earlier attempts at hand held systems have major draw-backs. When their camera lens is placed close to the object (one-half to two inches away) sever barreling, or fish-eye distortion and astigmatism distortion become quite evident. Moreover variable magnification in hand held units has been provided by changing the distance of the camera from the printed matter. Some units provide exchangeable length legs or attaching the camera to a vertically movable stand. Changing leg extensions sizes is clumsy and frustrating for someone partially sighted and moveable stands are so large they are no longer a truly hand held device.

There exists therefore, a significant need for a truly portable full function hand-held video system that provides a substantially distortion free image with a variable magnification feature that automatically stays in focus and is easy to use.

SUMMARY OF THE INVENTION

One object of the present invention is to provide a hand-held reading device for people with low vision which will magnify text and show the magnified text on a screen.

Another object is to provide such a reading device which will display the text substantially free of distortion.

Another object is to provide such a reading device which will automatically focus the text.

Another object is to provide such a reading device which has variable magnification.

Another object is to provide such a reading device which may be used with virtually any monitor.

Another object is to provide such a reading device which is easy to use.

These and other objects will become apparent to those skilled in the art in light of the following disclosure and accompanying drawings.

In accordance with the invention, generally stated, a magnifying device for magnifying an object and displaying the object on a monitor is provided. The device includes a hand held unit and a base unit. The hand held unit is operatively connected to the base unit, and the base unit is operatively connected to the monitor. The hand held unit has a housing including a top, a bottom, and side walls, the bottom defining an opening. The housing has legs depending from the bottom of the housing to maintain the housing a predetermined distance above the object magnified, and rollers extending between the legs to facilitate movement of the hand held unit over the object. A solid state camera is housed in the hand held unit above the opening. The camera is of the type which converts an optical signal to an electrical signal and includes a focusable lens. Focusing and zoom controls are provided to focus the lens and increase or decrease the size of the image displayed on the monitor.

Inverting circuitry is provided in the base unit for inverting the colors of the display, so that the display can be changed, for example, from black text on a white background to white text on a black background, and vice versa. An inverting switch which activates or toggles the inverting circuitry is provided on the hand held unit, so that it may be easily operated by the User. An on/off switch is also located on the hand held unit so that the user can turn on and off the magnifying device from the hand held unit.

The magnifying device is provided with a light housed in a diffuser to illuminate the object. The light is of sufficient strength to illuminate the object for the camera so that a good image of the object can be produced on the monitor. The light is preferably mounted to the underside of the housing bottom, adjacent the opening. To provide even lighting, lights are provided on either side of the opening.

The camera is mounted to a mounting board which has an opening through which said camera lens extends. A corrective lens is positioned beneath the camera lens to prevent distortion of the object magnified by the device, i.e. to minimize any fish-eye type distortion which has been produced by prior art magnifying devices. The corrective lens is fixed in a lens housing which is rotatably fixed to the camera lens.

The focusing control includes a focusing knob operably connected to the camera lens to rotate said camera lens to focus the camera. The focusing control includes a focusing rod which rotatably extends through the mounting board and the housing. The focusing knob is fixed to the rod externally of the hand held unit housing and a pulley is fixed to a bottom of the focusing rod beneath the mounting board. The lens housing defines a second pulley, and a band is provided to extend around the two pulleys, such that when the focusing knob is rotated, the camera lens is rotated, to focus the image. Preferably, a stop pin extends down from the camera mounting board and a limiting pin extends radially outwardly from he corrective lens housing to prevent rotation of the camera lens beyond normal operating limits. Preferably, the camera lens is prevented from rotating more than three or four times.

The zoom control is operatively connected to said mounting board to vertically move the mounting board to change the distance between the camera lens and the object being magnified. The housing includes a pair of guide rods extending between the top and bottom of the housing. The guide rods pass through the mounting board so that the mounting board may be moved vertically relative to the housing. Preferably linear bearings are press fit through the mounting board through which the guide rods extend. The zoom control includes an elongate zoom rod rotatably journaled about the focusing rod intermediate the focusing knob and the mounting board, and is thus vertically fixed relative to the focusing control and the mounting board. A helical groove is formed in said zoom rod and a vertically fixed pin is mounted in the housing to engage the zoom rod groove. Thus, when said zoom rod is rotated, it moves vertically relative to the housing, and vertically moves the mounting board, and hence the camera. Depending on the direction of rotation of the zoom rod, the camera will be moved closer to, or farther from, the object, to increase or decrease, respectively, the size of the image displayed on the monitor. Because the zoom control is interconnected with the focusing control, the camera need not be refocused after the magnification of the object has been changed.

The monitor may be either a video monitor or a television. The base unit includes a video out terminal, an RF In terminal, RF Out an terminal, so that it may be selectively connected to either the video monitor or a television using a cable. If the base unit is to be connected to a video monitor, the cable is received in the video-in terminal of the monitor and the video-out terminal of the base unit. If the monitor chosen is a television, the cable is received in the RF-out terminal of the base unit and the antenna terminal of the television. An antenna or cable TV cable can be connected to the RF-in terminal of the base unit. The magnifying device can thus remain connected to the television when not in use without interfering with normal operation of the television.

The magnifying device, as will be explained in full detail below, is one in which all the operating controls are held in the hand held unit, and may be connected to either a monitor or a television. Because of its small size, it is easily transportable. Further, the ability to invert the color scheme of the image displayed, allows the user to choose the best viewing format.

BRIEF DESCRIPTION OF THE DRAWINGS

FIG. 6 is a cross-sectional view of the hand held unit;

FIG. 7 is a cross-sectional view of a corrective lens used in association with the hand held unit to prevent distortion of enlarged text;

FIG. 8 is a cross-sectional view of a lens mount in which the corrective lens sits;

FIG. 9 is a top plan view of a guide of the reading device;

FIG. 10 is an end elevational view of the guide;

DESCRIPTION OF THE PREFERRED EMBODIMENT

Figure 1:
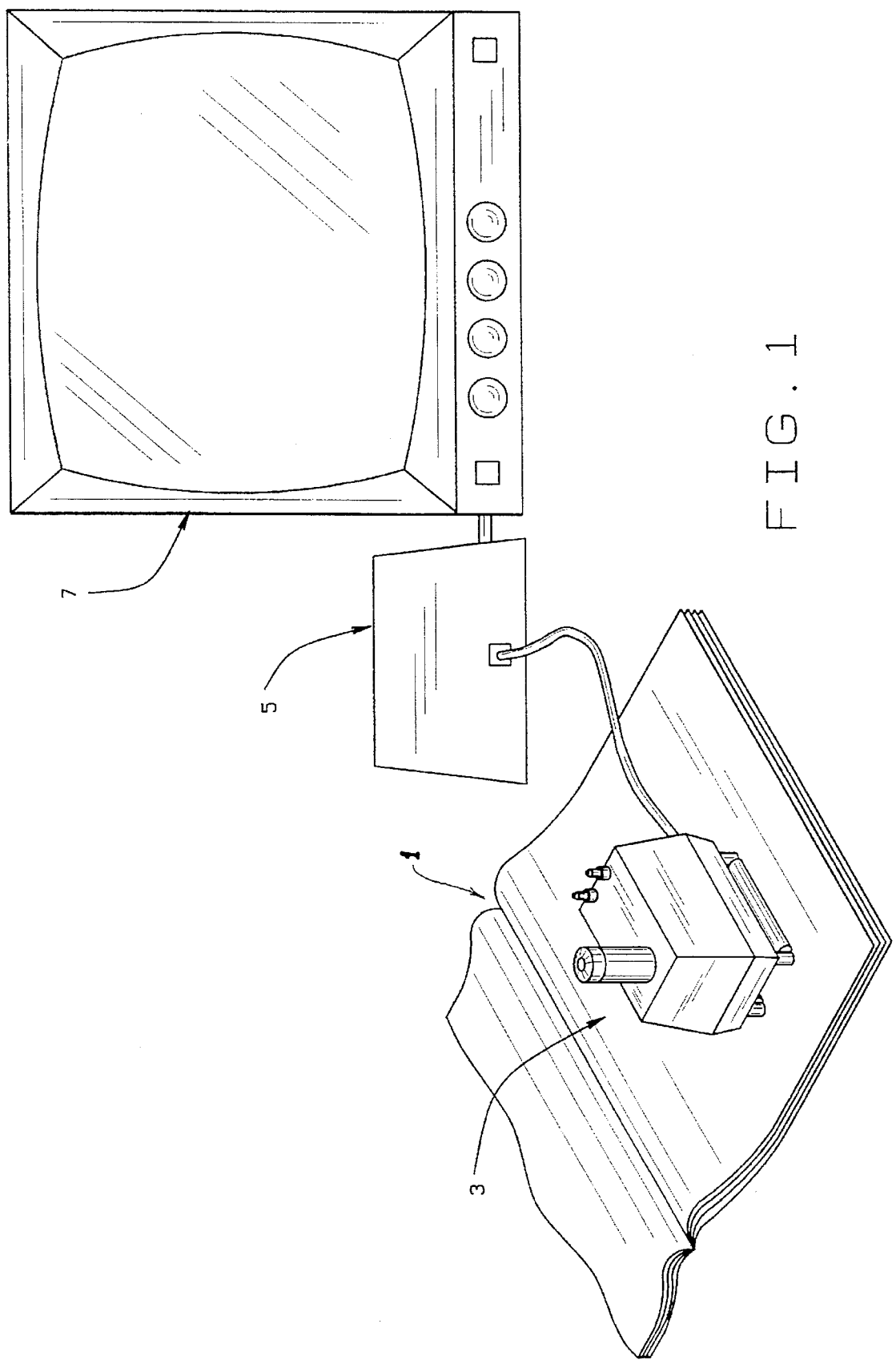
FIG. 1 is a is a perspective view of a reading device of the present invention operably connected to a monitor.

A reading or text magnification device 1 is shown generally in FIG. 1. Device 1 includes a hand held unit 3 which is operatively connected to a base unit 5 to transmit images to the base unit. The base unit 5 houses, among other items, the power supply, and is thus plugged into a wall outlet to provide power for the device. Base unit 5 is operatively connected to a monitor 7, such as a video monitor or television, to display magnified text on the monitor.

Hand-held unit 3, shown in detail in FIGS. 2–6, is sized to be easily held in a user's hand. Unit 3 includes a camera assembly 9 which is enclosed by a housing 11. Housing 11 includes a housing top 13 and a housing bottom 15. Housing bottom 15 includes a bottom wall 17 having an opening 19 formed therein. Lights 21 are placed on opposite sides of opening 19 to provide light for the camera assembly 9 and are preferably housed in diffusers. The diffusers disperse the light to lessen any glare from the lights on the text. Two pair of support legs 23 extend downwardly from bottom 17. Rollers 25 extend between the legs 23 and allow the hand held unit 3 to be easily rolled across a page of text, without getting caught on the page.

Figure 2:
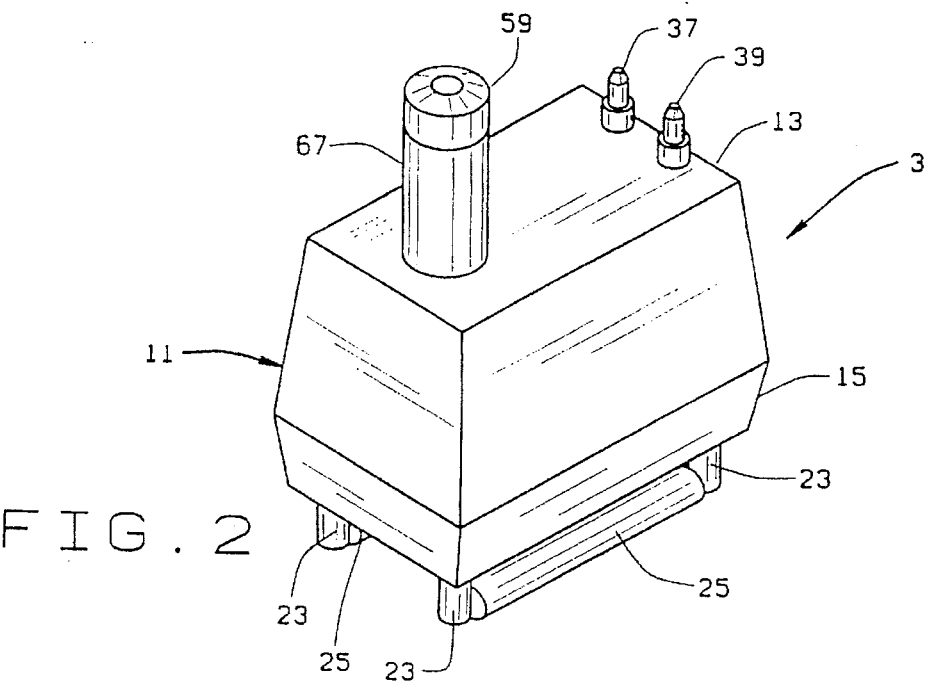
FIG. 2 is a perspective view of a hand unit of the reading device.
Figure 3:
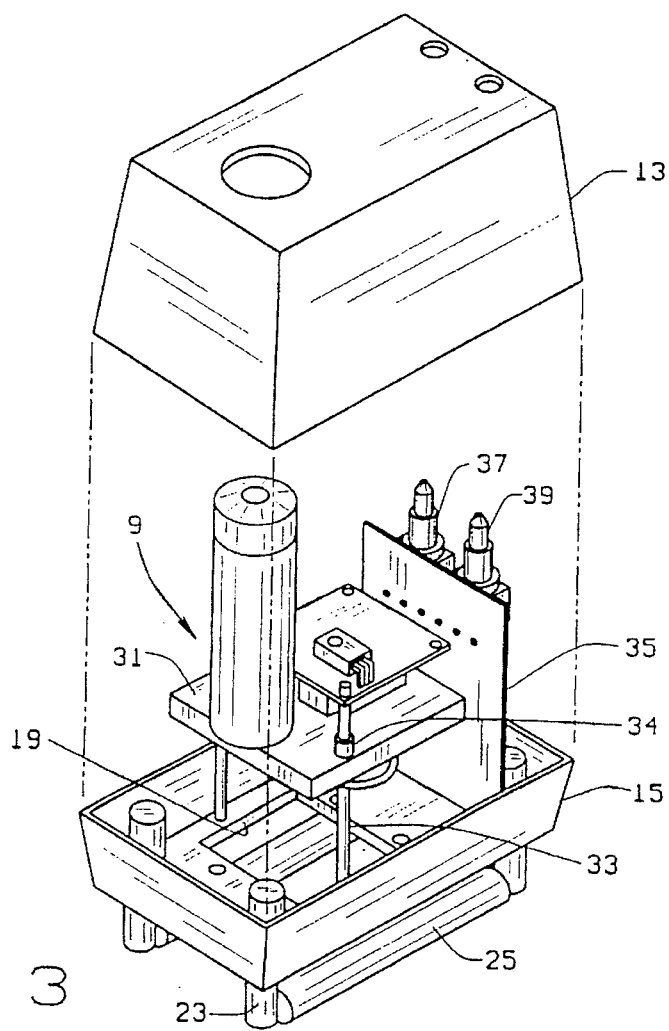
FIG. 3 is an perspective view of the hand held unit with a cover of the hand unit removed.
Figure 4:
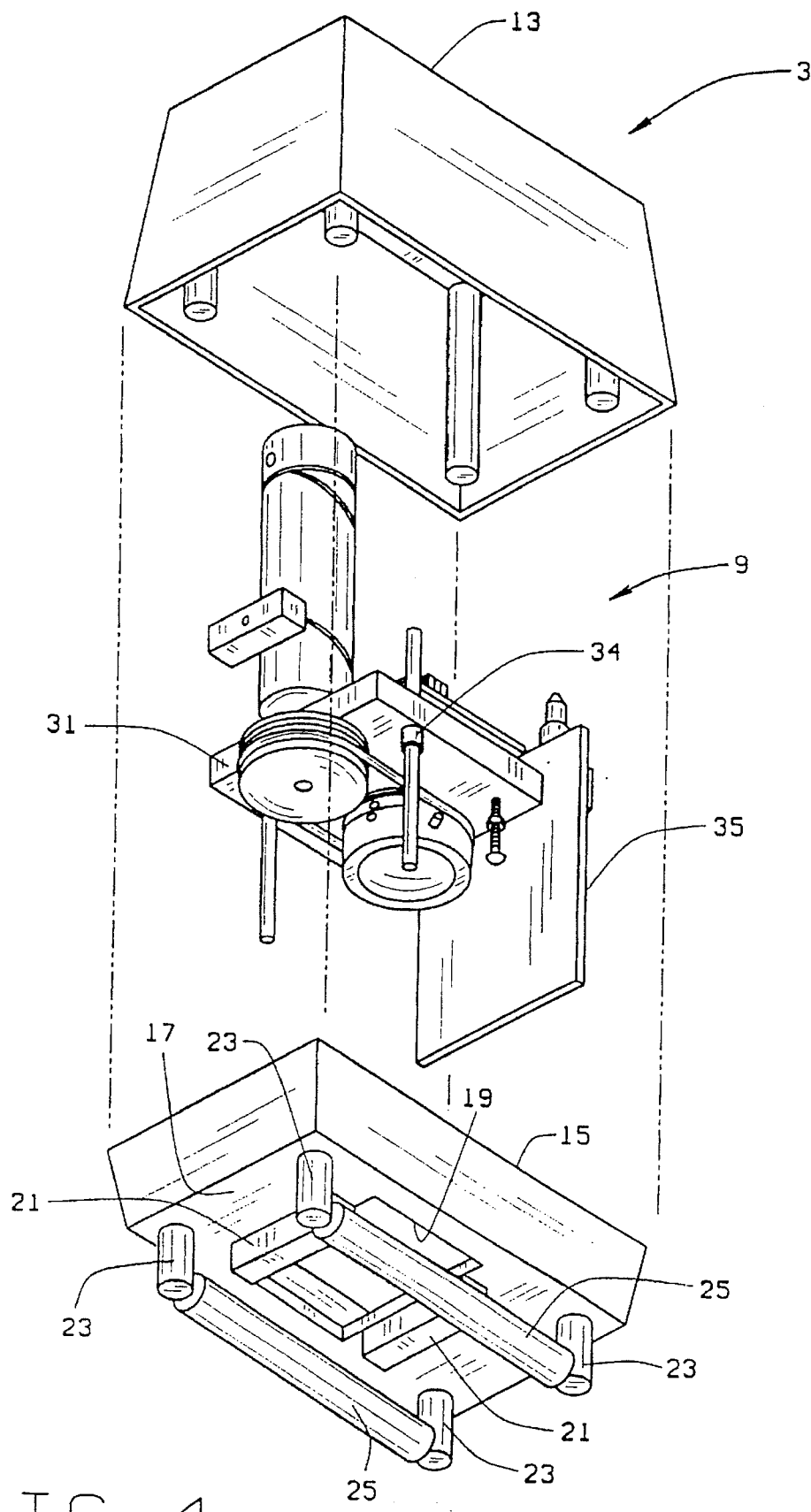
FIG. 4 is an exploded view of the hand unit.
Figure 5:
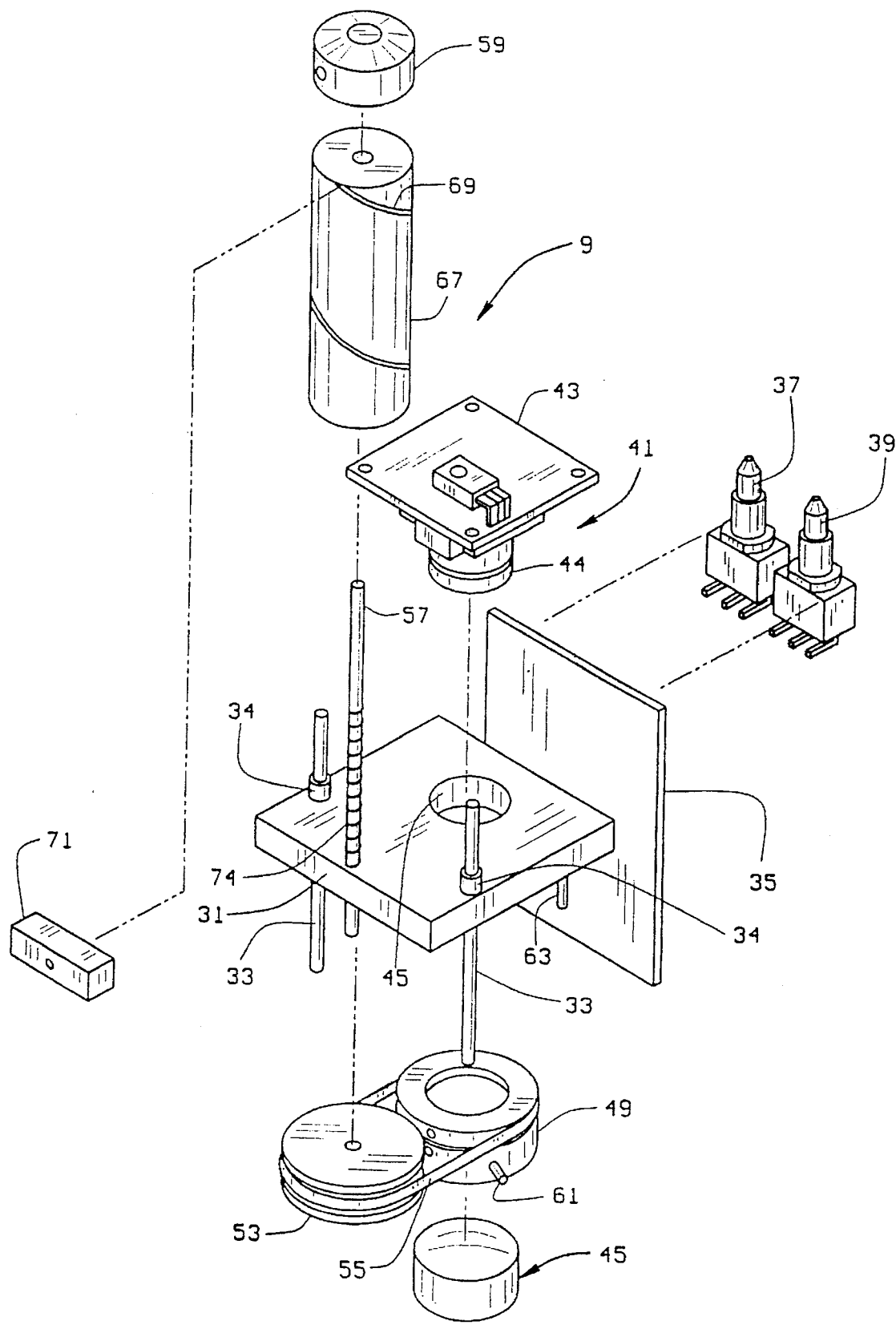
FIG. 5 is an exploded view of a camera mount and focus control assembly of the hand held unit.

Camera assembly 9 includes a platform 31 having a pair of guide rods 33 extending therethrough. Platform 31 is preferably movable vertically relative to rods 33. Guide rods 33 are received in small bores formed in housing bottom 17 to properly position platform 31 in housing 9. Preferably, linear bearings 34 are press fit into the opening in the platform 31 and the guide rods 33 pass through the linear bearings. The guide rods are longer than the board is thick, and thus extend slightly above and below the board 31. Although not necessary to operation of the device, the linear bearings 34 significantly improve the stability of the board and makes movement of the board 31 over the guide rods 33 smoother. An extension of the bearing 34 of about ⅛" above the board is sufficient to increase the stability of the board. Of course, the bearing could be longer or shorter, if desired. A switch PC board 35 is adjacent an edge of platform 31, to define a supporting third leg for the platform to balance the platform in the housing. Platform 31 can thus be maintained in a level position, generally parallel to the bottom of the housing. Two switches, a power switch 37 and an inverting switch 39 are electrically connected to the switch PC board 39. Switches 37 and 39 are externally accessible, preferably through the housing top 13 as shown in FIGS. 1–3, so that the device 1 may be operated by the user.

A camera 41 mounted to a PC board 43 is secured to platform 31. Platform 31 includes an opening 45 through which the camera extends. The camera lens 44 is in axial alignment with the bottom housing opening 19. The camera is preferably a solid state ⅓" CCD camera which will convert an optical signal to an electrical signal. Preferably, the camera has a focal length of between 20 mm and 31 mm and an aperture ($f$) of between 3.8 and 4.0. Preferably, the focal length is about 25.8 mm. Cameras which have been found to be acceptable are Chinon Model CX-060 with a 4 mm focal length, an aperture ($f$) of 3.5 and an 86° field of view, available from Chinon America, Inc., Electronic Imaging Division, in Mountainside, N.J. Also acceptable is camera model VM-311 with a 3.8 mm focal length, F/1.6 from Samsung Opto-Electronics America, in Secaucus, N.J., and Cumputar Model EM-200-L38 with a 3.8 mm focal length available from Chugai Boyeki (America) Corp., in Commack, N.Y.

To prevent the camera 41 from producing a distorted image (i.e. a fish-eye image) an adapter lens 45 is mounted beneath the camera lens. Lens 45 is preferably made from grade B glass and is convex on both sides. The radii of the two sides of lens 45 are different. Referring to FIG. 7, lens 45 has a radius $R_1$ of about 39.06" and a radius $R_2$ of about 22.87". The center thickness of the lens is between 11.6 mm and 12.0 mm. Lens 41 is press fit in a lens housing 49 which is rotatably fixed to the camera lens 44.

Unit 3 includes both a focusing control and a zoom control. Lens housing 49 includes a circumferential groove 51 so that housing 49 forms a pulley. A second pulley 53 is positioned adjacent pulley 49, and the two pulleys are operatively connected by a band 55. A focusing rod 57 extends through platform 31 and is connected to pulley 53, at the bottom of the rod. Rod 57 extends through housing cover 13, and a focusing knob 59 is rotatably secured to the top of the rod. Thus, when a user rotates knob 59, pulley 53 is rotated, to rotate pulley 49. Because pulley 49 is fixed to camera lens 44, the camera lens is rotated to focus the camera. Pulley 49 includes a stop pin 61 which will contact a limiting post 63 if the pulley is rotated too far. Limiting post 63 and stop one 61 prevent the pulley 49 from being rotated more than four revolutions. This is sufficient to move the lens between its two extreme positions (i.e. its furthest extended position and its least extended position).

The zoom control is operable to raise and lower the camera assembly 9 within the housing. Switch PC board 35 is fixed within housing 11. Assembly 9 thus moves vertically relative to board 35. A zoom knob or rod 67 is rotatably mounted about focus rod 57 and includes a generally helical groove 69. A zoom block 71 is secured to the inside surface of housing top 13. Block 71 includes a pin 73 which extends into the helical groove 69. (FIG. 6) Thus, when knob 67 is rotated, the helical groove 69 interacts with the pin 73, and knob 67 is raised or lowered. The focus knob 59 acts as a cap or stop for knob 67 to prevent the knob from moving vertically relative to focus rod 57. Thus, the focus rod acts as a tie rod to tie the knob 67 to the camera platform 31, and, when the zoom knob 67 is rotated, the camera assembly will be raised or lowered to change the magnification of the text shown on display 7. The zoom control and focus control are preferably interconnected, as shown, to reduce the number of knobs protruding from the housing. This also reduces the number of parts involved in the manufacture of the unit 3 and thus reduces its assembly time and cost.

A spring 74 is preferably placed about focusing rod 57 to be positioned between mounting board 31 and zoom rod 67. With the pulley 53 connected to one end of rod 57 and the fine tuning knob 59 connected to the opposite end, spring 74 is compressed. When the spring is compressed, it biases zoom rod 67 away from mounting board 31 to create a proper amount of spacing between the mounting board and the bottom of the zoom rod to facilitate smooth operation of the zoom control. The spring 74 also puts pressure on the zoom rod to force it against the fine tuning knob 59. This creates a friction between the zoom rod and the fine tuning knob to cause the fine tuning knob to turn in unison with the zoom control knob. Because the fine tune knob is connected to the camera lens via the threaded rod 57, the pulley and belt, focus is maintained as the zoom rod is turned. If the spring 74 is not used, some other means, such as a felt washer, would be needed to provide the proper friction so that the knob 59 will rotate when knob 67 is rotated, yet which will allow the two controls to be operated separately. The fine focus knob can be turned independently of the zoom rod by holding the zoom rod still while the fine focus knob is turned.

Camera PC board 43 is electrically connected to the switch board 35. Circuitry on board 43 converts the optical signal produced by the camera to an electrical signal. This electrical signal is then sent to the switch board 35 by the electrical connection between the two boards. The electrical connection between the cameral PC board 43 and switch board 35 also facilitates the transmission of control signals between the PC board and the switch board. For example, depressing the on/off switch will activate or deactivate the camera.

Figure 11:
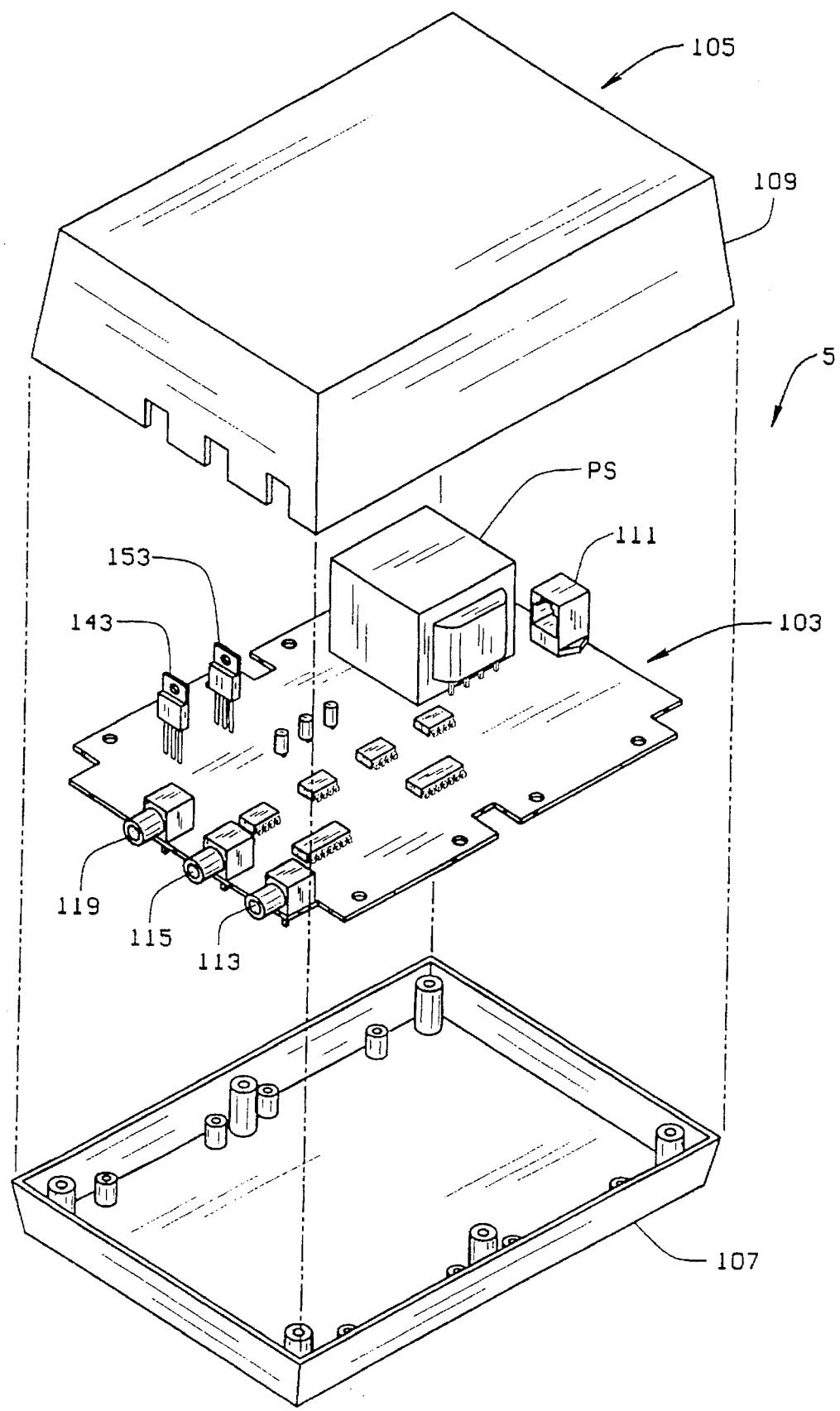
FIG. 11 is an exploded view of the base unit of the reading device.

Switch board 35, in turn is electrically connected to base unit 5 by an electrical line 101 which transmits the electrical signal produced by the camera PC board to the base unit and control signals produced by the switches 37 and 39. (FIGS. 13A and 13B) Base unit 5 is shown in more detail in FIG. 11. Unit 5 includes a PC board 103 contained in a housing 105 having a bottom 107 and a top 109. Board 103 includes an input 111 which receives line 101, and electrically connects line 101 to board 103. Board 103 also includes an antenna jack 113 to which an antenna or TV cable can be attached, a TV out jack 115 to connect the unit 5 to a standard television through the televisions antenna jack 117, and a video out jack 119 to connect the base 5 to a monitor via the monitors video in jack 121.

PC board 103 includes inverting circuitry I (FIG. 12) which can be activated to invert the picture shown on the monitor, i.e. it can change the display from black text on a white background to white text on a black background. The circuitry shown is the preferred circuitry which is compatible with the output produced by the camera used. Different circuitry may be needed if a camera which produces its output in a different format. The video signal from cameral 41 is initially passed through a switching circuitry S. Switching circuitry S determines if the inverting switch 39 has been toggled to invert the picture. If so, circuitry S sends the idea signal to inverting circuitry I. Circuitry I has an input 131 which receives the signal produced by the camera board 43 and passed on by switching circuitry S. The video signal is passed through the circuitry to an output 133 which is connected to switching circuitry S to send the signal back to circuitry S. Circuitry S is also connected to terminals 113, 115, and 119, to pass the signal to the proper terminal so that the picture produced can be viewed.

If the picture is to be viewed on a television, the video image is also passed to an RF Modulator M, after the signal is returned from the inverting circuitry. Modulator M send a modulated signal to terminal 115, so that the picture can be viewed over a television.

Figure 12A:
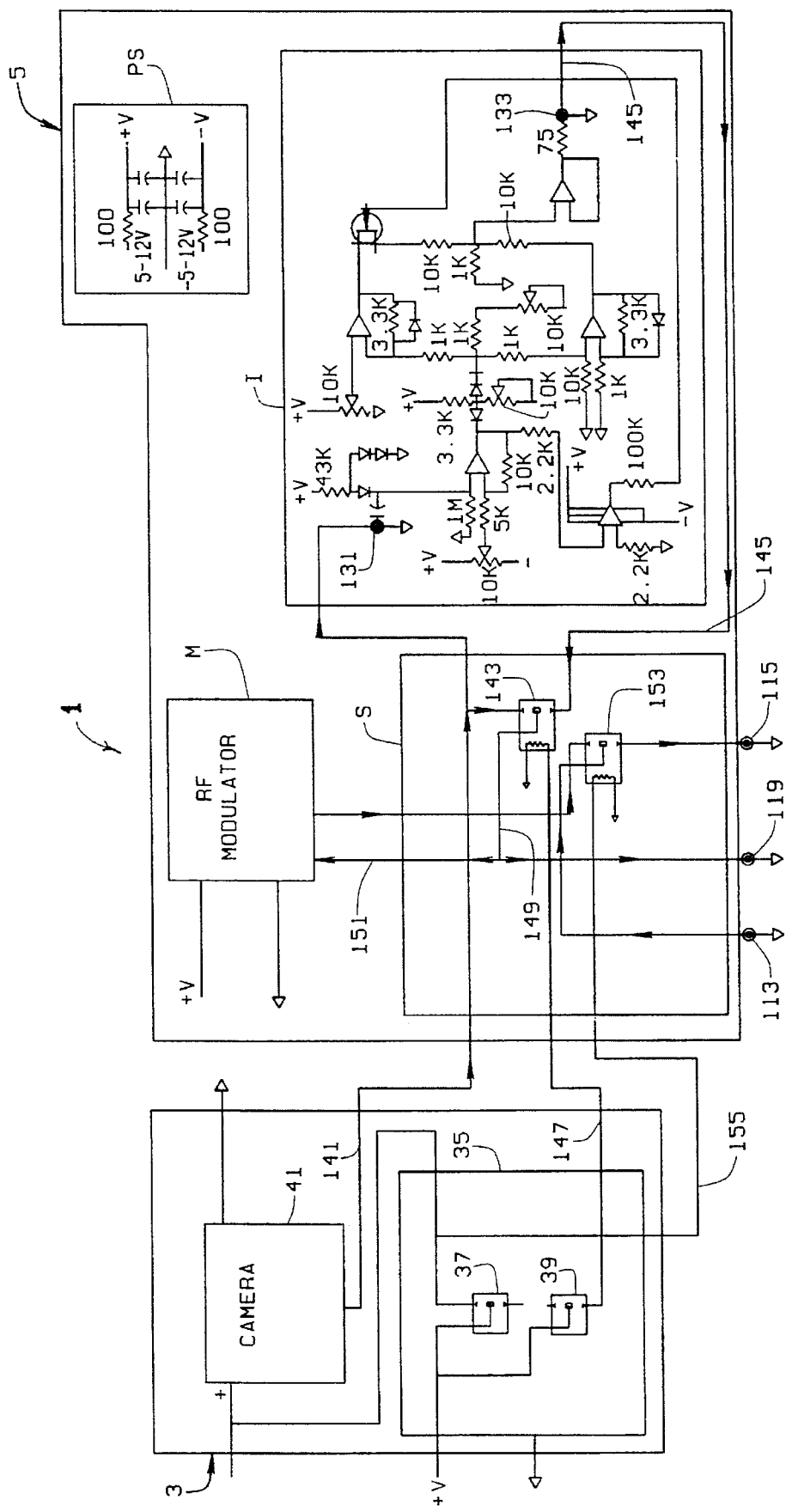
FIG. 12A is an electrical schematic of an inverting circuit contained in a base unit of the reading device.
Figure 12:
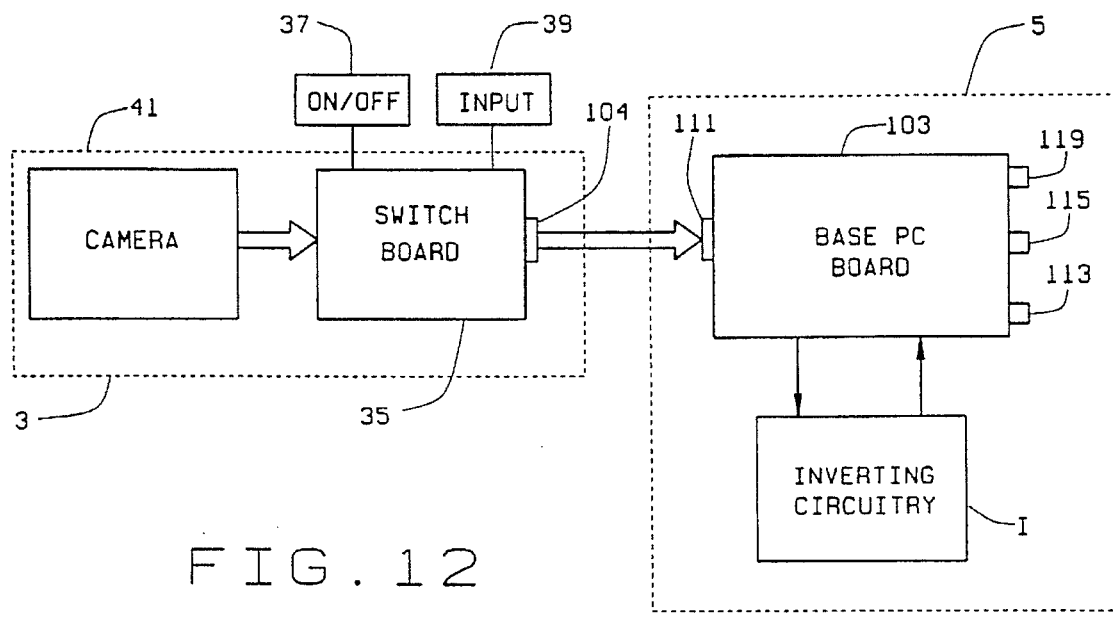
FIG. 12 is a block diagram of the reading device.

The electrical connections circuitry is shown in part in FIG. 12A. Device 1 receives power from a wall outlet. It includes an electrical cord which may be plugged into a wall outlet provide electricity lo device 1. The electricity from the outlet is delivered to a 12 V power supply PS contained in base unit 5. The power supply PS is a conventional power supply which converts the AC current to DC. Preferably, it is the power supply is a center tap transformer. The device 1 is activated by on-off switch 37 on board 35 in the hand held unit 3. Switch 37 is electrically connected to camera 41, to activate the camera, and to the inverting switch 39, which is also mounted on switch board 35. The video signal produced by the cameral is carried from the camera to the base unit over a video line 141. Video line 141 is feeds into the video input 131 of the inverting circuitry I in the base unit. Video line 141 is also connected to a switch 143 in the base unit. The inverted video signal which exits circuitry I from output 133 is also connected to switch 143, over a line 145. Switch 143 is electrically connected to inverting switch 39, in the hand piece 3, by a line 147. A video signal exits switch 143 over a line 149. The toggling of switch 39 opens and closes switch 143, such that when switch 143 is in one mode, the inverted signal from circuitry I is passed through switch 143 to line 149, and in the other mode, the unmodified signal from line 141 passes through switch 143 to line 149. Switch 143 thus acts as a gate or diverter which lets one or the other of the unmodified and inverted signals through to line 149. Line 149, in turn, is connected to the video out terminal 119, and to an RF modulator M over a line 151. The modulator M is, in turn, connected to the TV hookup 115, through a switch 153, so that the video signal can be viewed on a television set. The antenna in port 113 is also connected to switch 153. Switch 153 is electrically connected to on-off switch 37 by a line 155. If the device 1 is connected to a TV, as in FIG. 13B, when the device is off, switch 153 is in a first position or mode to allow the signal from the antenna to pass through switch 153 to the port 115. When the device is turned on, the switch 153 is turned to a second position or mode in which the signal from the switch 143 and RF modulator M is passed through switch 153 to port 115. Modulator M is operable to switch the device to output a signal which can be received over either channel two or channel three of the television, similar to the channel switch in a VCR.

Although not necessary, circuitry I, switches 149 and 153, and modulator M are all contained on, and connected to, board 103. Power supply PS is operatively connected to board 103 to supply power to the device 1. As can be appreciated, lines 141, 147, and 155, which exit from hand unit 3 are all carried by cord 101.

The noted above, inverting circuitry I is toggled on and off by switch 39. As can be appreciated, switch 39 produces a toggling signal which is transmitted to switch board 35, through line 101, to board 103 and switch 143 to toggle the inverting circuitry, i.e. activate it or deactivate it. The location of the inverting switch makes operation of the inverting feature by the user simple. The user does not have to fumble around to locate the base unit, and then locate a switch on the base unit. The switch is at the user's fingertips, to be activated by the user when desired.

Figure 13A:
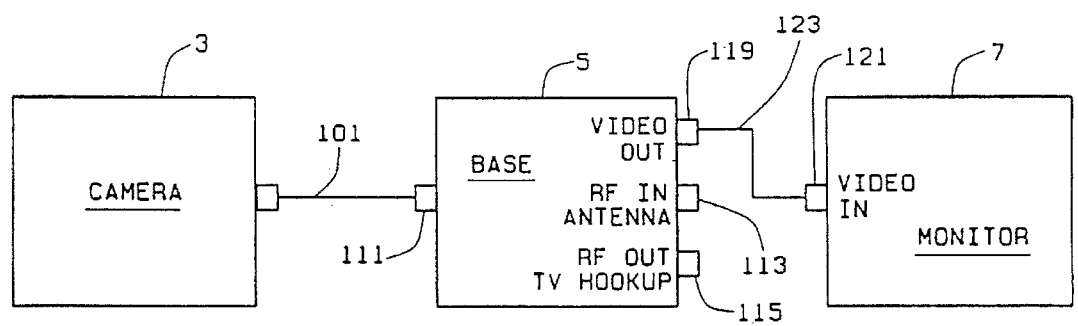
FIG. 13A is a block diagram of the connection between the reading device and a monitor.

As alluded to above, magnification device 1 can be connected to either a monitor, such as a video monitor, or a standard television set. As shown in FIG. 13A, when the device 1 is connected to a monitor, a cable 123 is inserted in the Video Out terminal 119 of base unit 5 and is connected to the Video In terminal 121 of the monitor.

Figure 13B:
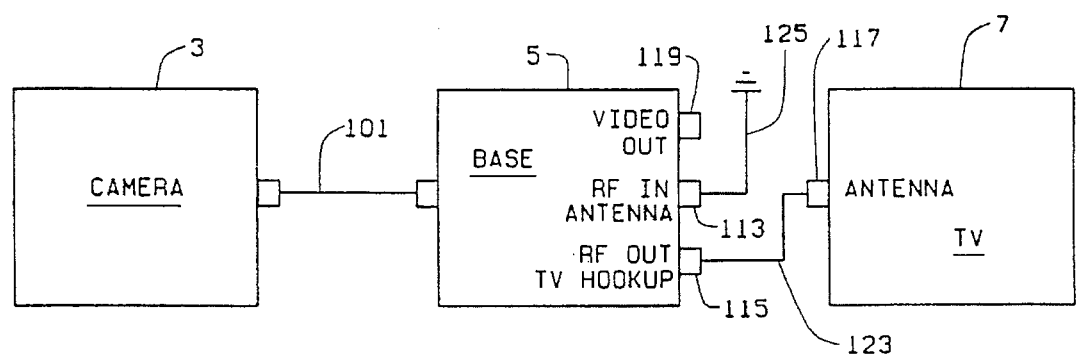
FIG. 13B is a block diagram of the connection between the reading device and a television.

As shown in FIG. 13B, when the device 1 is to be connected to a television, cable 123 is connected between the RF Out terminal 113 of base unit 5 and the Antenna terminal 117 of the television. An antenna 125 or Cable TV cable is connected to the RF In terminal 113 of the base unit 5. This connection is similar to the connection of a VCR to a television. When the device 1 is connected to a television, it need not be disconnected from the television when it is not in use and the television is to be used. As explained above, when device 1 is not in use, the signal received by antenna 125 is passed to cable 123 to be received by the television. The television can thus be used as a television. However, when the device 1 is turned on using switch 37, the signal received by the antenna is interrupted or disconnected, and the signal produced by the device 1 is transmitted to the television so that the user may read the text over which the device is placed.

In operation, device 1 is turned on using on/off switch 37 and the hand held unit is placed on the book, newspaper, magazine, etc. which is to be read. Using focusing knob 59, the user can focus the text. If the text is too small, the text can be enlarged using zoom knob 67. The interconnection of the zoom and focusing mechanisms enables the text to stay in focus as the size of the text is changed. Thus, the user should not need to refocus the text if the zoom control is used. If the user finds the text to be easier to read if it is white text on a black background (or vice versa), the user simply depresses switch 39 on hand held unit 3.

The rollers 25 enable the user to easily and smoothly glide the hand held unit 3 over the text which is enlarged. Because the device is provided with rollers 25 which are spaced a determined distance from the bottom 17 of the unit 3 by legs 23, the camera is maintained at that distance without the user supporting the unit 3 above the text. The user thus need not support the camera above the text, a feat which can be both trying and tiring.

If the unit 3 is to be passed over a page which is not generally planar, the user may use a guide tray 141. (FIGS. 8 and 9). Tray 141 is placed over the book, magazine, etc. and provides a flat, planar surface over which the camera can be rolled. Tray 141 includes a board 143 made from a transparent material, such as a clear acrylic sheet. Side bars 145 extend the length of the tray, along the edges of the board 143. Although not necessary, bars 145 are also preferably made from a clear acrylic. The distance between the inner surfaces 147 of bars 145 is at least slightly wider than the distance between the outer surfaces of the legs 23, so that the bars do not interfere with the easy movement of the unit 3 across the tray 141.

Guide tray 141 has been found to be of great use. It provides a straight and smooth path for the camera to be moved over. This is especially helpful for those, such as the elderly or individuals with diseases such as Parkinson's disease, who no longer have a steady hand. The guide tray can also be used as a "training device" to enable users to move the camera across a page as they learn get the "feel" of the hand held portion of the device.

As can be seen, the device 1 provides a magnifier for text which can be connected either to a monitor or a television. If connected to a television, it can be left connected to the television without interrupting normal operation of the television when device 1 is not in use. All controls are on the handpiece, facilitating easy control of the device. Further, the inverting circuitry allows the user to select a format which may be easier to read. The hand held portion 3 of the device is small. Preferably it is only about 2.3" tall, 3.3" long, and 2" wide. It can thus easily fit in the palm of an adult for easy grasping and control of the hand held portion.

As variations within the scope of the appended claims may be apparent to those skilled in the art, the foregoing description is set forth only for illustrative purposes and is not meant to be limiting. The base unit 5 can be provided with a channel switch, such as is common on VCR's, to switch the output to be received on channel 2 or 3 of a television. This would be a switch that is only set when the unit 1 is initially installed, and thus, the all the operating controls remain on the hand held portion 5. Although the camera described has a lens that is focused by rotating, a camera having a barrel lens, which is focused by sliding the lens in and out could also be used. In this case, the focusing rod 57 is threaded and is passed through the camera and mounting board and into a threaded hole in the lens mount, so that when the rod 57 is rotated, the lens mount is moved vertically to focus the camera. This, of course, eliminates the need for the pulley. For example, the focus control and zoom control could be separate from each other. Spring 74 can be replaced with lock nuts to space the zoom rod 67 above the mounting board 31. These examples are merely illustrative.

We claim:

1. A magnifying device for magnifying an object and displaying the object on a monitor, the device including:

a hand held unit which, when used, is placed in close proximity to the object to be magnified, the hand held unit having a housing including a top, a bottom, and side walls; said bottom defining an opening;

legs depending from the bottom;

rollers rotatably connected to the legs at a bottom end of the legs to facilitate movement of the hand held unit over the object;

a solid state camera housed in said hand held unit above said opening which converts an optical signal to an electrical signal, said camera including a lens, said lens being focusable, said camera being mounted to a mounting board, said mounting board defining an opening through which said camera lens extends;

a focusing control for focusing said camera lens, said focusing control including a focusing knob operable connected to said camera lens to move said camera lens to focus said camera, and a focusing rod which rotatably extends through said mounting board and said housing, said focusing knob being fixed to said rod externally of said hand held unit housing, a pulley fixed to a bottom of said focusing rod beneath said mounting board, and a band operatively engaging said pulley and said camera lens, such that when said focusing knob is rotated, said camera lens is rotated; and a zoom control for altering the size of the image displayed on the monitor; and a base unit, said hand held unit being electrically connected to said base unit to transmit the signal produced by said camera to said base unit, said base unit being connectable to the monitor to display the signal produced by the camera on the monitor.

2. The magnifying device of claim 1 wherein said hand held unit is sufficiently small to be held in the hand of a user.

3. The magnifying device of claim 1 including inverting circuitry for inverting the colors of the display and an inverting switch for activating and deactivating said inverting circuitry; said inverting circuitry being housed in said base unit and said inverting switch being housed on said hand held unit, said inverting switch being operably connected to the inverting circuitry to activate and deactivate the circuitry.

4. The magnifying device of claim 3 including an on/off switch, said on/off switch being housed on said hand held unit, said on/off switch being operable to turn on and off the magnifying device.

5. The magnifying device of claim 4 including a switch board; said on/off switch and said inverting switch being electrically connected to said switch board and being accessible through said hand held unit housing; said camera being operatively connected to said switch board and said switch board being operably connected to said base unit to transmit the signal produced by said camera to said base unit.

6. The magnifying device of claim 1 including a light which illuminates the object to be displayed on the monitor.

7. The magnifying device of claim 6 wherein said light is mounted to an outer surface of said hand held unit housing bottom and is housed in a diffuser.

8. The magnifying device of claim 7 wherein said light is positioned adjacent said hand held unit bottom opening.

9. The magnifying device of claim 1 wherein said zoom control is operatively connected to said mounting board to vertically move said mounting board to change the distance between said camera lens and said object being magnified; said mounting board being mounted in said hand held unit housing for vertical movement relative to said housing, said housing having at least one guide rod extending between the top and bottom of said housing, said mounting board being journaled over said guide rod.

10. The magnifying device of claim 9 including a linear bearing which passes through said mounting board, said guide rod extending through said linear bearing.

11. The magnifying device of claim 9 wherein said zoom control includes an elongate zoom rod rotatably journaled about said focusing rod, a helical groove being formed in said zoom rod, a vertically fixed pin which engages said zoom rod groove, such that when said zoom rod is rotated, it moves vertically relative to said housing; said zoom rod being mounted intermediate the focusing knob and the mounting board, such that the zoom rod is vertically fixed relative to the focusing rod; whereby, when the zoom rod is moved vertically, the focusing control, and hence the mounting board and camera, are moved vertically.

12. The magnifying device of claim 1 including a corrective lens positioned beneath said camera lens, said corrective lens being operable to prevent distortion of the object magnified by the device.

13. The magnifying device of claim 12 wherein the corrective lens has an upper surface and a lower surface, said upper and lower surfaces both being convex.

14. The magnifying device of claim 13 wherein said upper surface has a radius $R_1$ and said lower surface has a radius $R_2$, the radius $R_1$ being larger than the radius $R_2$.

15. A hand held unit for an electronic magnifying device for magnifying and displaying text on a monitor; the hand held unit including:

a housing including a top, a bottom, and side walls; said bottom defining an opening;

legs depending from the bottom;

rollers rotatably connected to the legs at a bottom end of the legs to facilitate movement of the hand held unit over the object:

a solid state camera housed in said hand held unit above said opening which converts an optical signal to an electrical signal, said camera including a lens, said lens being focusable, said camera being mounted to a mounting board, said mounting board defining an opening through which said camera lens extends, said mounting board being disposed in said unit housing for vertical movement relative to said housing;

a corrective lens disposed below said camera lens to prevent distortion of the object magnified by the device a focusing control for focusing said camera lens, said focusing control including a focusing knob operably connected to said camera lens to rotate said camera lens to focus said camera; said focusing control including a focusing rod which rotatably extends through said mounting board and said housing, said focusing knob being fixed to said rod externally of said hand held unit housing, a pulley fixed to a bottom of said focusing rod beneath said mounting board, and a band operatively engaging said pulley and said camera lens, such that when said focusing knob is rotated, said camera lens is rotated; and a zoom control for altering the size of the image displayed on the monitor, said zoom control being interconnected with said focusing control such that when said zoom control is operated, said image does not have to be refocused, said zoom control being operatively connected to said mounting board to vertically move said mounting board to change the distance between said camera lens and said object being magnified; said zoom control including an elongate zoom rod rotatably journaled about said focusing rod, a helical groove being formed in said zoom rod, a vertically fixed pin which engages said zoom rod groove, such that when said zoom rod is rotated, it moves vertically relative to said housing; said zoom rod being mounted intermediate the focusing knob and the mounting board, such that the zoom rod is vertically fixed relative to the focusing rod; whereby, when the zoom rod is moved vertically, the focusing control, and hence the mounting board and camera, are moved vertically.

16. The hand held unit of claim 15 wherein said housing includes at least on guide rod extending between the top and bottom of said housing, said mounting board being journaled over said guide rod.

17. The hand held unit of claim 15 including a lens housing rotatably fixed to said camera lens, said corrective lens being mounted in said lens housing.

18. The hand held unit of claim 17 wherein said lens housing defines a pulley, said band extending around said lens housing such that said lens housing, and hence said camera lens, is rotated when said focusing knob is turned.

19. The hand held unit of claim 18 wherein said lens housing includes a limiting pin extending generally radially from said lens housing and said camera mounting board includes a stop pin depending therefrom, said stop pin being positioned to engage said limiting pin when said lens housing is rotated to prevent said lens housing from being rotated beyond an operating range of said lens.

20. The hand held unit of claim 15 including a guide tray, said guide tray laid upon the object to be viewed, said guide tray having side bars, said tray with said side bars accommodating the movement of the hand held magnifying device and its rollers thereon to facilitate usage of said hand held magnifying device.

* * * * *